United States Patent
Suganuma et al.

(10) Patent No.: US 12,164,122 B2
(45) Date of Patent: Dec. 10, 2024

(54) ELECTROMAGNETIC FLUX CONTROLLING MEMBER

(71) Applicant: Enplas Corporation, Saitama (JP)

(72) Inventors: Takayoshi Suganuma, Saitama (JP); Takayuki Arai, Saitama (JP)

(73) Assignee: Enplas Corporation, Saitama (JP)

( * ) Notice: Subject to any disclaimer, the term of this patent is extended or adjusted under 35 U.S.C. 154(b) by 383 days.

(21) Appl. No.: 17/670,558

(22) Filed: Feb. 14, 2022

(65) Prior Publication Data

US 2022/0326417 A1 Oct. 13, 2022

(30) Foreign Application Priority Data

Feb. 16, 2021 (JP) .................................. 2021-022498

(51) Int. Cl.
*G02B 5/02* (2006.01)
*H01Q 15/08* (2006.01)

(52) U.S. Cl.
CPC ......... *G02B 5/0278* (2013.01); *G02B 5/0215* (2013.01); *G02B 5/0231* (2013.01); *H01Q 15/08* (2013.01)

(58) Field of Classification Search
CPC ........ H01Q 15/02; H01Q 15/08; H01Q 19/06; H01Q 19/062; H01Q 29/06; H01Q 29/062; G02B 1/118; G02B 5/0215; G02B 27/0955; G02B 5/0278; G02B 5/0231; G02B 27/0961; G02B 2003/0093; G02B 3/00; G02B 3/02; G02B 3/04; G02B 3/08; F21V 5/04
See application file for complete search history.

(56) References Cited

U.S. PATENT DOCUMENTS

| | | | | |
|---|---|---|---|---|
| 2014/0063610 A1* | 3/2014 | Murata | .................. | G02B 1/118 |
| | | | | 359/613 |
| 2019/0129070 A1* | 5/2019 | Chien | ................. | B29D 11/0048 |
| 2021/0194144 A1* | 6/2021 | Hayashi | .................... | C23F 4/00 |

FOREIGN PATENT DOCUMENTS

| | | | | | |
|---|---|---|---|---|---|
| CN | 105470659 A | * | 4/2016 | ............. | H01Q 15/02 |
| JP | 2004361906 A | * | 12/2004 | | |
| JP | 2007127855 A | * | 5/2007 | | |
| JP | 2007-171857 | | 7/2007 | | |
| JP | 2011013562 A | * | 1/2011 | | |
| JP | 2012-058584 | | 3/2012 | | |
| JP | 2013105054 A | * | 5/2013 | | |
| JP | 2016157049 A | * | 9/2016 | | |
| WO | WO-2019130198 A1 | * | 7/2019 | ......... | B29D 11/0074 |

* cited by examiner

*Primary Examiner* — Erin Kryukova

(57) ABSTRACT

An electromagnetic flux controlling member includes an incidence surface for allowing incidence of an electromagnetic wave, and an emission surface for emitting the electromagnetic wave incident on the incidence surface to an outside. At least one of the incidence surface and the emission surface includes a base curved surface and a plurality of protrusions arranged on the base curved surface. Each of the plurality of protrusions includes a conical tip portion disposed such that at least a part of an edge of a bottom surface of the conical tip portion makes contact with the base curved surface, and a partially columnar leg portion disposed between the conical tip portion and the base curved surface. A central axis of the conical tip portion and a central axis of the partially columnar leg portion are parallel to a main axis of the electromagnetic flux controlling member.

8 Claims, 11 Drawing Sheets

ELECTROMAGNETIC FLUX CONTROLLING MEMBER

CROSS REFERENCE TO RELATED APPLICATIONS

This application is entitled to and claims the benefit of priority of Japanese Patent Application No. 2021-022498, filed on Feb. 16, 2021, the disclosure of which including the specification, drawings and abstract is incorporated herein by reference in its entirety.

TECHNICAL FIELD

The present invention relates to an electromagnetic flux controlling member.

BACKGROUND ART

In radio communication, it is known to use a lens antenna as a means for transmitting more information over a long distance with high efficiency. The lens antenna has a function of controlling the traveling direction of electromagnetic waves including radio waves, such as a function of converting a spherical wave to a plane wave. In recent years, the lens antenna has begun to be used for electromagnetic waves including radio waves of a short wavelength, such as quasi-millimeter waves, millimeter waves, and terahertz waves.

Conventionally, an electromagnetic flux controlling member (lens) such as the lens antenna includes a dielectric medium such as ceramics or resin. Thus, the dielectric constants of the lens and the air layer are different from each other, and their refractive indexes to electromagnetic waves are also different from each other. Therefore, when the electromagnetic waves including radio waves and light are incident on the lens, the reflection of the electromagnetic waves occurs at the interface.

As a lens being unlikely to cause such reflection of the electromagnetic waves, a lens is known which has, on the lens surface, fine protrusions with a sectional area decreasing toward the outside. In the lens in which a plurality of protrusions described above are arranged on the surface, the average refractive index of the electromagnetic waves in the vicinity of the tips of the protrusions is substantially equal to the refractive index in the air, and the average refractive index of the electromagnetic waves in the vicinity of the bases of the protrusions is approximately equal to the refractive index in the lens. Therefore, the change in the refractive index occurring between the tips and the bases are gentle. Thus, the reflection is unlikely to occur when the electromagnetic wave is incident or emitted. In addition, the longer the distance between the tips and the bases in the emission direction of the electromagnetic wave (the greater the heights of the protrusions), the more gentle the change in the refractive index. It is thus possible to further reduce the reflection of the electromagnetic waves. Further, the more such protrusions are disposed on the lens surface, the more the reflection of the electromagnetic waves can be reduced.

For example, Patent Literature (hereinafter, referred to as "PTL") 1 discloses an optical element in which a microstructure with periodic recesses and protrusions for providing an anti-reflection function is formed in and on at least a part of the element surface. PTL 1 describes that the reflection of light can be suppressed by setting the angle of the direction along the periodic recesses and protrusions of the above microstructure with respect to the element surface to an angle within ±15 degrees with respect to the incidence direction or the exit direction of the light.

PTL 2 discloses a substrate with an anti-reflection optical structure, and a manufacturing method for the substrate. In the anti-reflection optical structure, fine protrusions having a conical shape or a pyramidal shape are disposed on the substrate surface, and a continuous protrusion is disposed that is formed by the tops of the fine protrusions connected to one another into an arc shape. PTL 2 describes that reflection of visible light can be suppressed by using the above substrate, and the protrusions can also be disposed on a curved surface.

CITATION LIST

Patent Literature

PTL 1
  Japanese Patent Application Laid-Open No. 2007-171857
PTL 2
  Japanese Patent Application Laid-Open No. 2012-058584

SUMMARY OF INVENTION

Technical Problem

In the lens as described in PTL 1, as illustrated in FIG. 1A, at least some protrusions 10 of the plurality of protrusions 10 are disposed on a curved surface (base curved surface) in a state of being inclined with respect to the emission direction of the electromagnetic wave (arrow in FIG. 1A). In such a lens, it is difficult to secure the height of protrusions 10 in the emission direction of the electromagnetic wave (X in FIG. 1) and the change in the average refractive index is not gentle. It may thus be impossible to sufficiently reduce the reflection of the electromagnetic wave.

Therefore, as illustrated in FIG. 1B, it is conceivable to arrange a plurality of protrusions 10 such that main axis Y1 of the lens and central axis Y2 of protrusions 10 are parallel to each other (see PTL 2). However, when protrusions 10 are thus arranged on the curved surface (on the base curved surface), the larger the inclination of the curved surface with respect to main axis Y1, the longer the widths of the bases of protrusions 10 (Z in FIG. 1B) become. Accordingly, the ratio at which one protrusion 10 occupies the curved surface increases. Therefore, in the outer peripheral portion of the lens, it is impossible to sufficiently increase the density of protrusions 10. It may thus be impossible to sufficiently suppress the reflection of electromagnetic waves.

The present invention has been made in view of the above circumstances, and an object thereof is to provide an electromagnetic flux controlling member capable of suppressing the reflection of electromagnetic waves by a plurality of protrusions arranged on a curved surface (on a base curved surface).

Solution to Problem

An electromagnetic flux controlling member according to the present invention is an electromagnetic flux controlling member including an incidence surface for allowing incidence of an electromagnetic wave; and an emission surface for emitting the electromagnetic wave incident on the incidence surface to an outside, in which at least one of the incidence surface and the emission surface includes a base curved surface and a plurality of protrusions arranged on the base curved surface, each of the plurality of protrusions includes: a conical tip portion disposed such that at least a part of an edge of a bottom surface of the conical tip portion makes contact with the base curved surface, and a partially columnar leg portion disposed between the conical tip portion and the base curved surface, and a central axis of the conical tip portion and a central axis of the partially columnar leg portion are parallel to a main axis of the electromagnetic flux controlling member.

Advantageous Effects of Invention

According to the present invention, it is possible to provide an electromagnetic flux controlling member capable of suppressing the reflection of electromagnetic waves by a plurality of protrusions arranged on a curved surface (on a base curved surface).

DESCRIPTION OF EMBODIMENTS

Hereinafter, embodiments of the present invention will be described in detail with reference to the drawings.

Embodiment 1

(Configuration of Electromagnetic Flux Controlling Member)

Figure 1A:
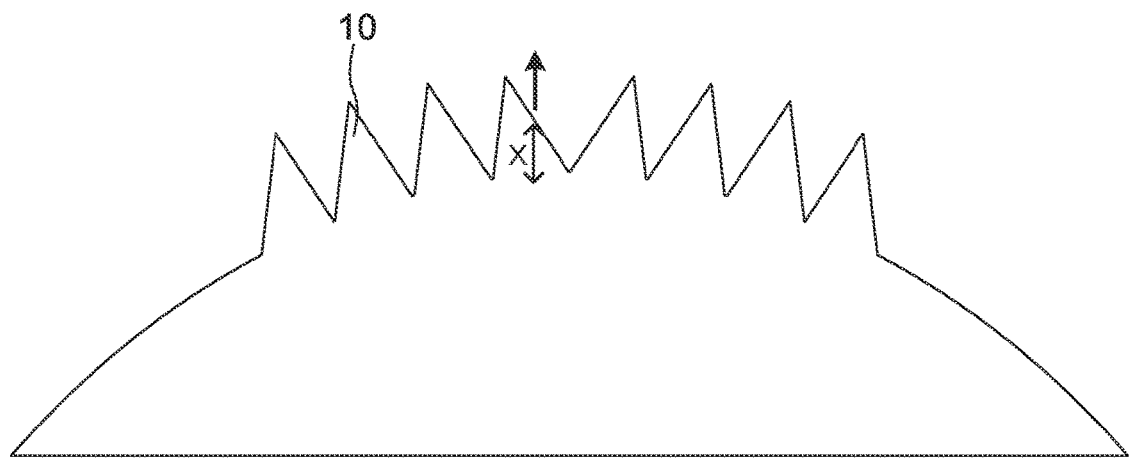
FIG. 1A schematically illustrates a lens in which protrusions are disposed to be inclined with respect to the emission direction of an electromagnetic wave.
Figure 1B:
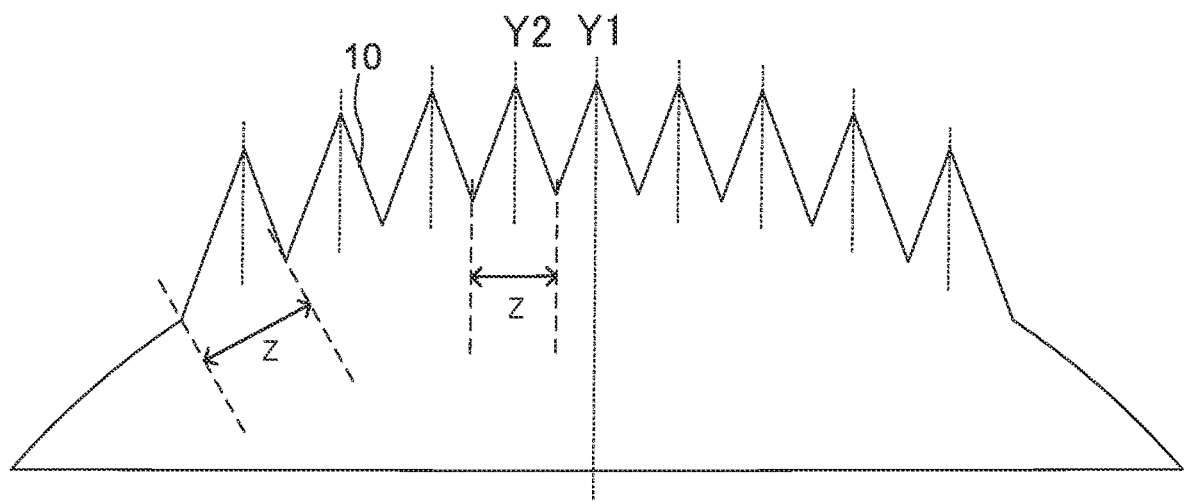
FIG. 1B schematically illustrates a lens in which protrusions are disposed so that the central axis of the protrusions and the main axis of the lens are parallel to each other.
Figure 2:
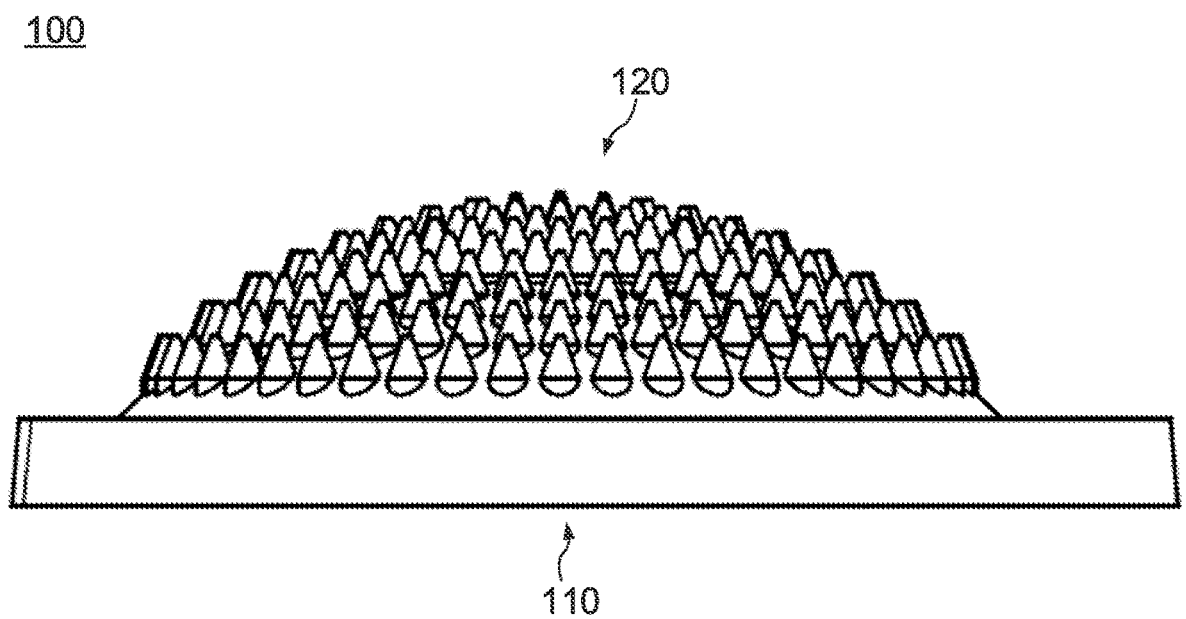
FIG. 2 is a left side view of an electromagnetic flux controlling member according to Embodiment 1.
Figure 3A:
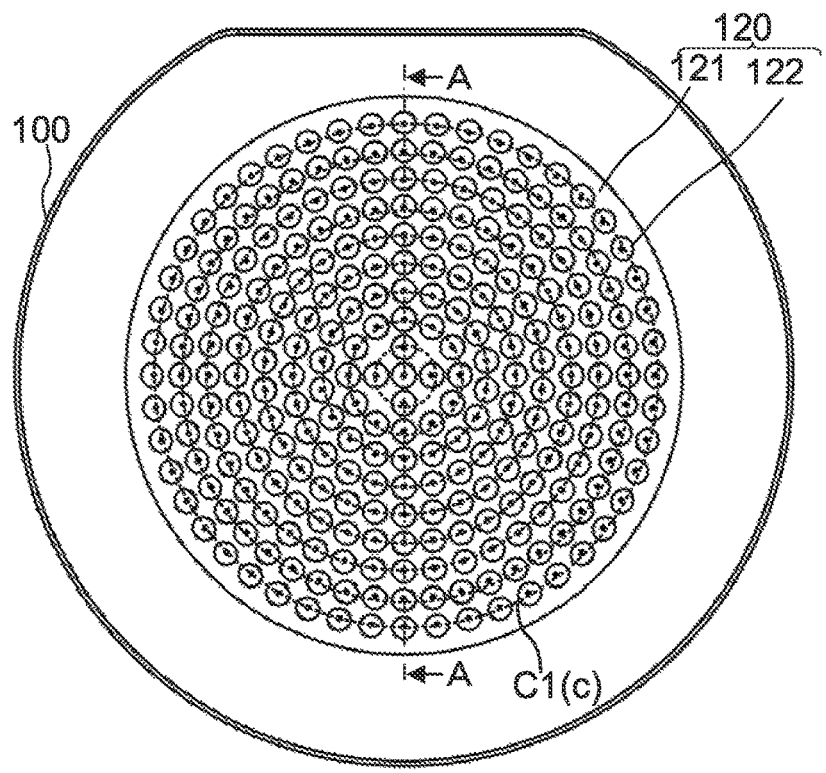
FIG. 3A is a plan view of the electromagnetic flux controlling member according to Embodiment 1.
Figure 3B:
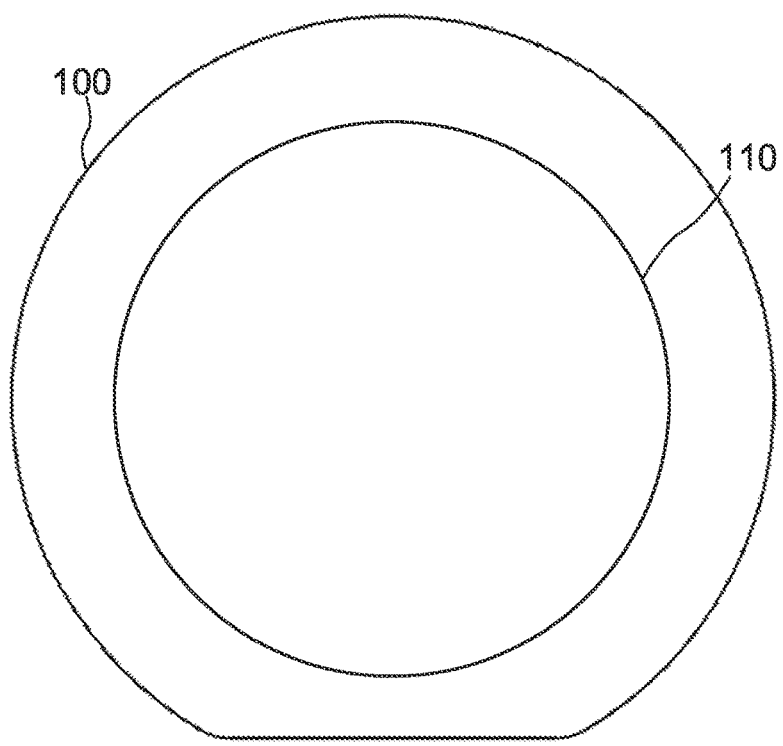
FIG. 3B is a bottom view of the electromagnetic flux controlling member according to Embodiment 1.
Figure 4:
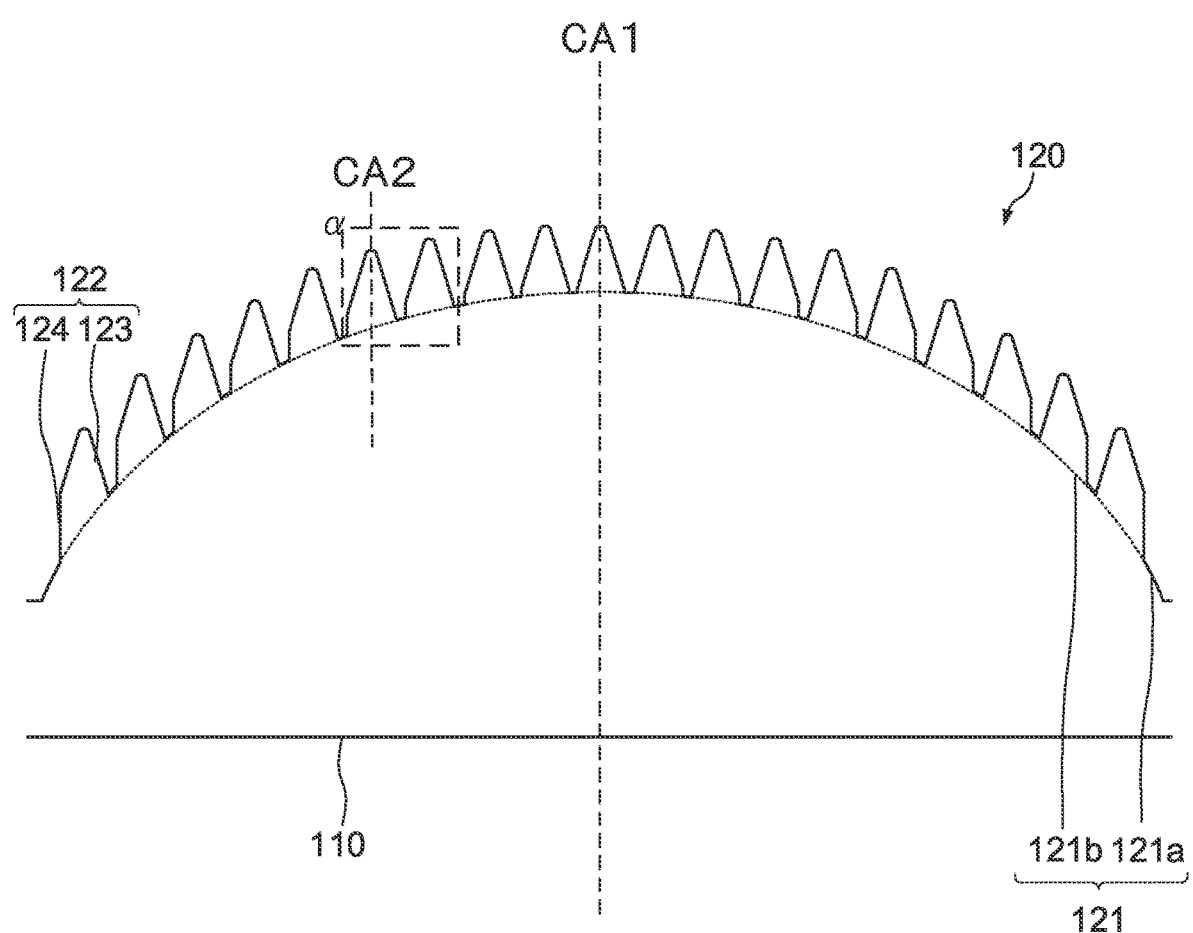
FIG. 4 is a schematic sectional view taken along line A-A in FIG. 3A.

FIGS. 2 to 4 illustrate a configuration of electromagnetic flux controlling member 100 according to Embodiment 1 of the present invention. FIG. 2 is a left side view of electromagnetic flux controlling member 100. FIG. 3A is a plan view of electromagnetic flux controlling member 100, and FIG. 3B is a bottom view of electromagnetic flux controlling member 100. FIG. 4 is a schematic sectional view taken along line A-A in FIG. 3A. In FIG. 4, for ease of understanding of the shape of base curved surface 121 and protrusions 122, the scale is changed and hatching is omitted.

As illustrated in FIGS. 2 to 4, electromagnetic flux controlling member 100 has incidence surface 110 and emission surface 120. Emission surface 120 includes base curved surface 121, and a plurality of protrusions 122.

The material included in electromagnetic flux controlling member 100 is not particularly limited as long as it exhibits the effect of the present invention, and is appropriately selected from among materials that can transmit electromagnetic waves to be controlled. Examples of the material included in electromagnetic flux controlling member 100 include ceramics, resin materials, glass, and the like. Examples of the resin materials include polypropylene, polycycloolefin, polytetrafluoroethylene, and the like.

In the present embodiment, the type of the electromagnetic wave to be controlled is not particularly limited. Examples of the electromagnetic wave include radio waves such as millimeter waves and quasi-millimeter waves, visible light, infrared rays, and the like.

Incidence surface 110 is a part of the surface of electromagnetic flux controlling member 100 for allowing the electromagnetic wave to enter electromagnetic flux controlling member 100 while controlling the traveling direction of the electromagnetic wave. Incidence surface 110 is disposed to intersect main axis CA1 of electromagnetic flux controlling member 100. Here, in the present specification, the "main axis of electromagnetic flux controlling member 100" refers to a central axis of electromagnetic flux controlling member 100, and is a straight line passing through the center of each of incidence surface 110 and emission surface 120. The main axis of electromagnetic flux controlling member 100 is also referred to as "optical axis."

The shape of incidence surface 110 is not particularly limited. In the present embodiment, the shape of incidence surface 110 is rotationally symmetrical with respect to main axis CA1 of electromagnetic flux controlling member 100 as a rotational axis. More specifically, in the present embodiment, the shape of incidence surface 110 is a substantially circular flat surface.

Emission surface 120 is a part of the surface of electromagnetic flux controlling member 100 for emitting the electromagnetic wave incident on incidence surface 110 to the outside of electromagnetic flux controlling member 100 while controlling the traveling direction. Emission surface 120 is disposed to intersect main axis CA1 of electromagnetic flux controlling member 100. Emission surface 120 includes base curved surface 121, and a plurality of protrusions 122 disposed on base curved surface 121.

Base curved surface 121 is a generic term for one or more curved surfaces 121a and one or more imaginary curved surfaces 121b of emission surface 120. In the present embodiment, curved surfaces 121a are a curved surface existing between the plurality of protrusions 122. Imaginary curved surfaces 121b are a curved surface positioned under protrusions 122 and assumed to exist smoothly continuingly with surrounding curved surface 121a. One or more curved surfaces 121a and one or more imaginary curved surfaces 121b smoothly continuingly constitute one base curved surface 121.

Base curved surface 121 may have only curved surfaces 121a, may have only imaginary curved surfaces 121b, or may have both curved surfaces 121a and imaginary curved surfaces 121b. As illustrated in FIGS. 3A and 4, in the present embodiment, base curved surface 121 has one curved surface 121a and a plurality of imaginary curved surfaces 121b. That is, in the present embodiment, emission surface 120 has one curved surface 121a and a plurality of protrusions 122 disposed respectively on the plurality of imaginary curved surfaces 121b. As described later, when incidence surface 110 has the base curved surface and a plurality of protrusions, emission surface 120 does not have to have a plurality of protrusions 122. In this case, base curved surface 121 of emission surface 120 has only curved surface 121a.

The shape of base curved surface 121 is not particularly limited, and is appropriately set according to how the electromagnetic wave is controlled. In the present embodiment, the shape of base curved surface 121 is rotationally symmetrical with respect to main axis CA1 of electromagnetic flux controlling member 100 as a rotational axis. More specifically, in the present embodiment, base curved surface 121 is a convex aspherical surface. That is, electromagnetic flux controlling member 100 according to the present embodiment has a shape in which a plurality of protrusions 122 are disposed on the convex lens surface (emission surface 120) based on the plano-convex lens.

Figure 5:
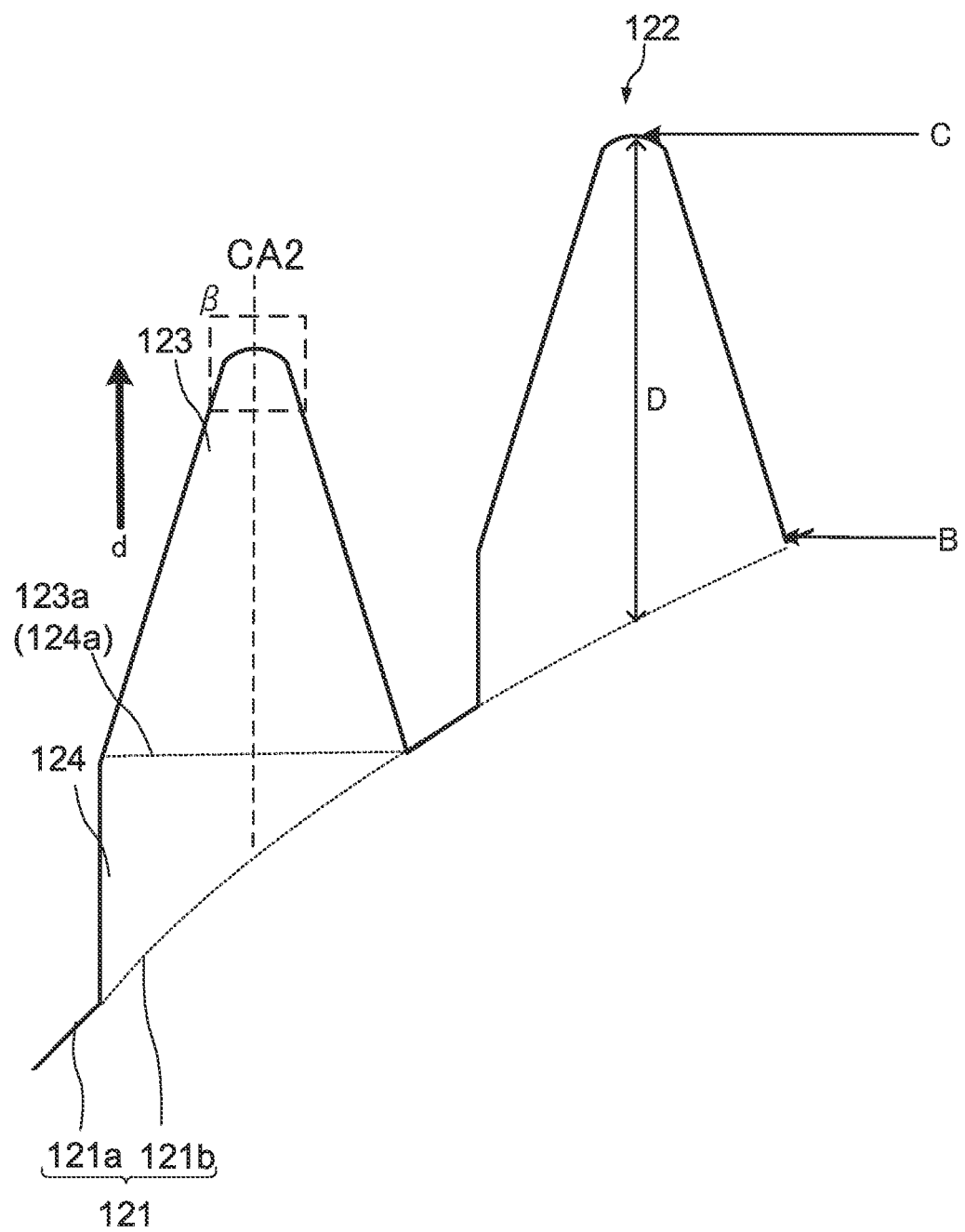
FIG. 5 is a partially enlarged sectional view of portion α in FIG. 4.

FIG. 5 is an enlarged view of portion α in FIG. 4. The plurality of protrusions 122 are protrusions arranged on base curved surface 121, each of which has conical tip portion 123 and partially columnar leg portion 124. Here, the term "partially columnar" means a remaining portion of a columnar body after having been partly cut. In the present embodiment, a plurality of protrusions 122 are arranged on imaginary curved surfaces 121b of base curved surface 121, and are integrally molded with other components of electromagnetic flux controlling member 100. Therefore, in the vicinity of the bases of tip portions 123 (B in FIG. 5), the average refractive index for electromagnetic waves is substantially equal to the refractive index of the material forming electromagnetic flux controlling member 100. On the other hand, in the vicinity of the tip end of tip portions 123 (C in FIG. 5), the cross-sectional area of each of protrusions 122 in a direction perpendicular to main axis CA1 (traveling direction of the electromagnetic wave) is small. Thus, the average refractive index with respect to the electromagnetic wave is substantially equal to the refractive index of the air. At this time, since the cross-sectional area is smaller toward the tip from the base of tip portion 123, the change in refractive index of the electromagnetic wave from electromagnetic flux controlling member 100 to the surrounding air can be continuous and gentle. Therefore, at emission surface 120, it is possible to make it unlikely to cause reflection of the electromagnetic wave emitted.

Each of tip portions 123 is a cone disposed such that at least a part of an edge of bottom surface 123a of the tip portion makes contact with base curved surface 121. As described above, in the present embodiment, tip portion 123 is formed integrally with leg portion 124, and bottom surface 123a of tip portion 123 does not actually exist. Therefore, in the present embodiment, "bottom surface 123a of tip portion 123" is an imaginary bottom surface of the cone. Since the distance between base curved surface 121 and the tip end of tip portion 123 can be kept within a certain range by disposing tip portion 123 so that at least a part of the edge of bottom surface 123a makes contact with base curved surface 121, the control on the electromagnetic wave by the shape of base curved surface 121 is not hindered.

The shape of tip portion 123 is not particularly limited as long as it is conical. Examples of the shape of tip portion 123 include cones, regular polygonal pyramids, and the like. In the present embodiment, tip portion 123 is substantially conical. From the viewpoint of not hindering the control on the electromagnetic wave by the shape of base curved surface 121, it is preferable that the sizes and shapes of tip portions 123 are the same.

The distance from the base of tip portion 123 to the tip end (the distance along main axis CA1 between B and C in FIG. 5) is not particularly limited, but is preferably 0.1 times or more and 0.25 times or less the wave length of the electromagnetic wave. The distance within the above range allows continuous and gentle change in the refractive index, and also makes it easier to demold electromagnetic flux controlling member 100 during manufacturing by molding with a metal mold.

Each of leg portions 124 is a partially columnar body disposed between tip portion 123 and base curved surface 121. Further, in the present embodiment, leg portion 124 is disposed such that one bottom surface 124a of the column is in contact with bottom surface 123a of tip portion 123. As described above, in the present embodiment, tip portion 123 is formed integrally with leg portion 124. Thus, bottom surface 124a of leg portion 124 does not actually exist. Therefore, in the present embodiment, "bottom surface 124a of leg portion 124" is an imaginary bottom surface of the partially columnar body. Leg portion 124 has such a shape as that of a columnar body that is disposed directly below tip portion 123 so as to fill the space between tip portion 123 and base curved surface 121 (the other bottom surface is located on the incidence surface 110 side of base curved surface 121), and that is cut out along base curved surface 121. By disposing partially columnar leg portions 124 between conical tip portions 123 and base curved surface 121, the area occupied by one protrusion 122 on base curved surface 121 as seen in plan view can be constant (the same as the bottom surface of the columnar body) even if the distances between tip portions 123 and base curved surface 121 are changed. Therefore, it is possible to increase the number of a plurality of protrusions 122 (density) on emission surface 120, so as to make it unlikely to cause reflection of the electromagnetic wave to be emitted.

The size and shape of leg portion 124 are not particularly limited as long as they satisfy the above conditions. Examples of the shape of leg portion 124 include partially cylindrical bodies, partially prismatic bodies, and the like. In the present embodiment, leg portions 124 are partially cylindrical. In addition, from the viewpoint of increasing the number (density) of protrusions 122, it is preferable that the sizes and shapes of bottom surfaces 123a of tip portions 123 and the sizes and shapes of bottom surfaces 124a of leg portions 124 are close to each other in plan view, or more preferably are identical to each other. For example, if bottom surface 124a of leg portion 124 is larger than bottom surface 123a of tip portion 123, a part of the electromagnetic wave is unintentionally emitted from bottom surface 124a of leg portion 124. To avoid this, by making the size and shape of bottom surface 123a of tip portion 123 substantially the same as the size and shape of bottom surface 124a of leg portion 124, the electromagnetic wave can be emitted while being appropriately controlled. In addition, by making the sizes and shapes these bottom surfaces substantially the same, it becomes possible to easily integrally mold the plurality of protrusions 122. In the present embodiment, the size and shape of bottom surface 123a of tip portion 123 are the same as the size and shape of bottom surface 124a of leg portion 124.

In the plurality of protrusions 122, central axis CA2 of tip portion 123 and central axis CA2 of leg portions 124 are parallel to main axis CA1 of electromagnetic flux controlling member 100. In the present embodiment, the "central axis of tip portion 123" means a straight line passing through the tip of tip portion 123 (cone) and perpendicular to bottom surface 123*a* of tip portion 123. The term "central axis of leg portion 124" means a straight line passing through the center (center of gravity) of bottom surface 124*a* of leg portion 124 (columnar body) and perpendicular to bottom surface 124*a*. In the present embodiment, central axis CA2 of tip portion 123 and central axis CA2 of leg portion 124 are located on the same straight line. When central axis CA2 of tip portion 123 and central axis CA2 of leg portion 124 are parallel to main axis CA1 of electromagnetic flux controlling member 100, the heights of the plurality of protrusions 122 (Din FIG. 5) can be appropriately secured in the emission direction of the electromagnetic wave (arrow d in FIG. 5). Thus, at tip portion 123, it is possible to make a change in refractive index gentle and to make it unlikely to cause reflection of the electromagnetic wave.

The arrangement of the plurality of protrusions 122 on base curved surface 121 is not particularly limited. For example, when electromagnetic flux controlling member 100 is seen in plan view, a plurality of protrusions 122 are disposed on concentric circles around a point where main axis CA1 of electromagnetic flux controlling member 100 passes, and arranged at equal intervals on the circumferences of the same circles included in the concentric circles. By this arrangement, it is possible to increase the number of a plurality of arranged protrusions 122 while increasing the ratio of a partial area of the plurality of disposed protrusions 122 with respect to the area of base curved surface 121. It is thus possible to make it unlikely to cause reflection of the emitted electromagnetic wave. Further, by the above arrangement, it is possible to facilitate demolding of electromagnetic flux controlling member 100 during manufacture by molding it with a metal mold. As illustrated in FIG. 3A, in the present embodiment, a plurality of protrusions 122 are arranged at equal intervals on the circumferences of same circles c included in concentric circles C1 around the point where main axis CA1 passes.

In the present embodiment, the ratio of the partial area of the plurality of disposed protrusions 122 with respect to the area of base curved surface 121 is not particularly limited, but is preferably as large as possible from the viewpoint of making it unlikely to cause reflection of the electromagnetic waves, and a ratio closer to 100% is preferable.

The intervals between the plurality of protrusions 122 arranged on the circumferences of same circles c are appropriately set according to the size of electromagnetic flux controlling member 100 and the size and shape of the plurality of protrusions 122. The intervals are not particularly limited, but it is preferable that the intervals be narrower. Further, it is preferable that the protrusions be in contact with one another on the circumferences of same circles c.

Figure 6:
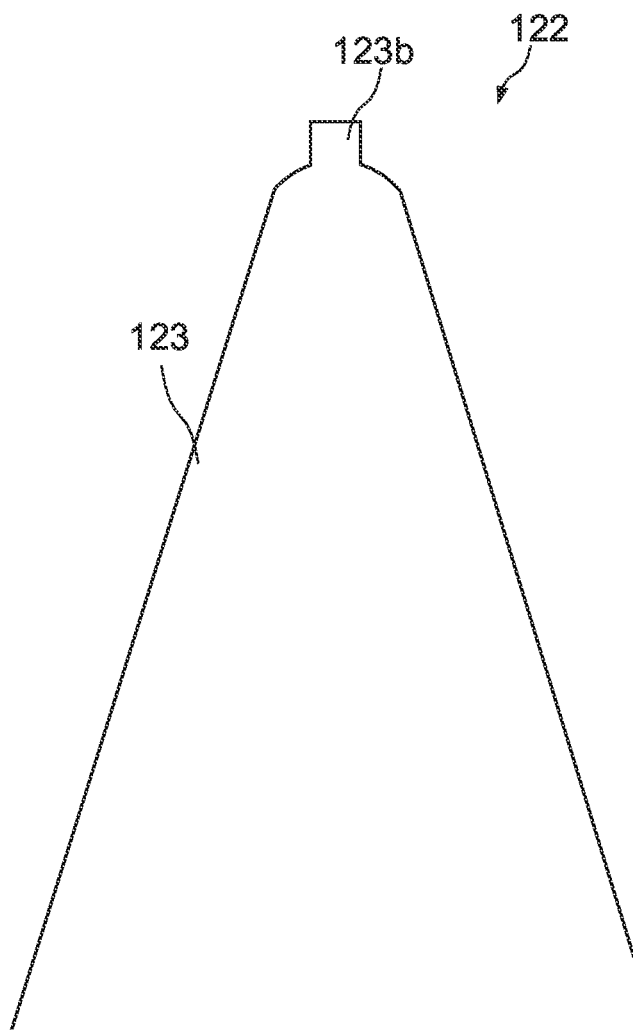
FIG. 6 is a partially enlarged sectional view of portion β in FIG. 5.

FIG. 6 is an enlarged sectional view of portion β in FIG. 5. As illustrated in FIG. 6, in the present embodiment, tip portions 123 of the plurality of protrusions 122 may have small projections 123*b*. For example, each of small projections 123*b* is formed by a gas vent formed in the mold used in manufacturing electromagnetic flux controlling member 100. The size of small protrusion 123*b* is not particularly limited as long as it is smaller than the minimum cross-sectional area of tip portion 123.

[Variation]

Figure 7:
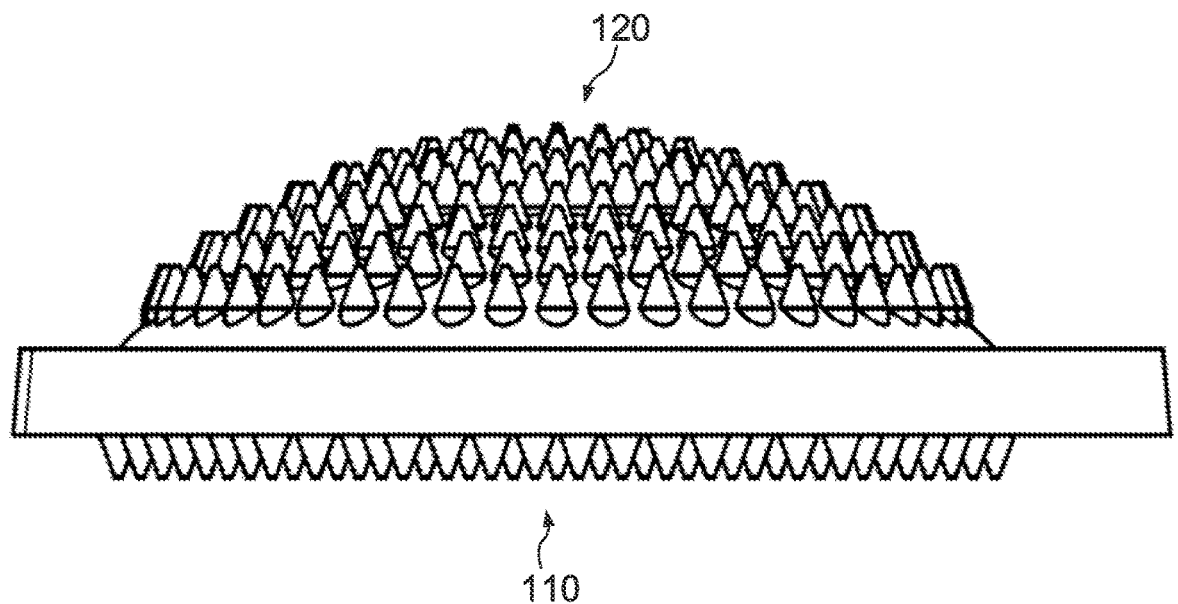
FIG. 7 is a left side view of the electromagnetic flux controlling member according to a variation of Embodiment 1.
Figure 8:
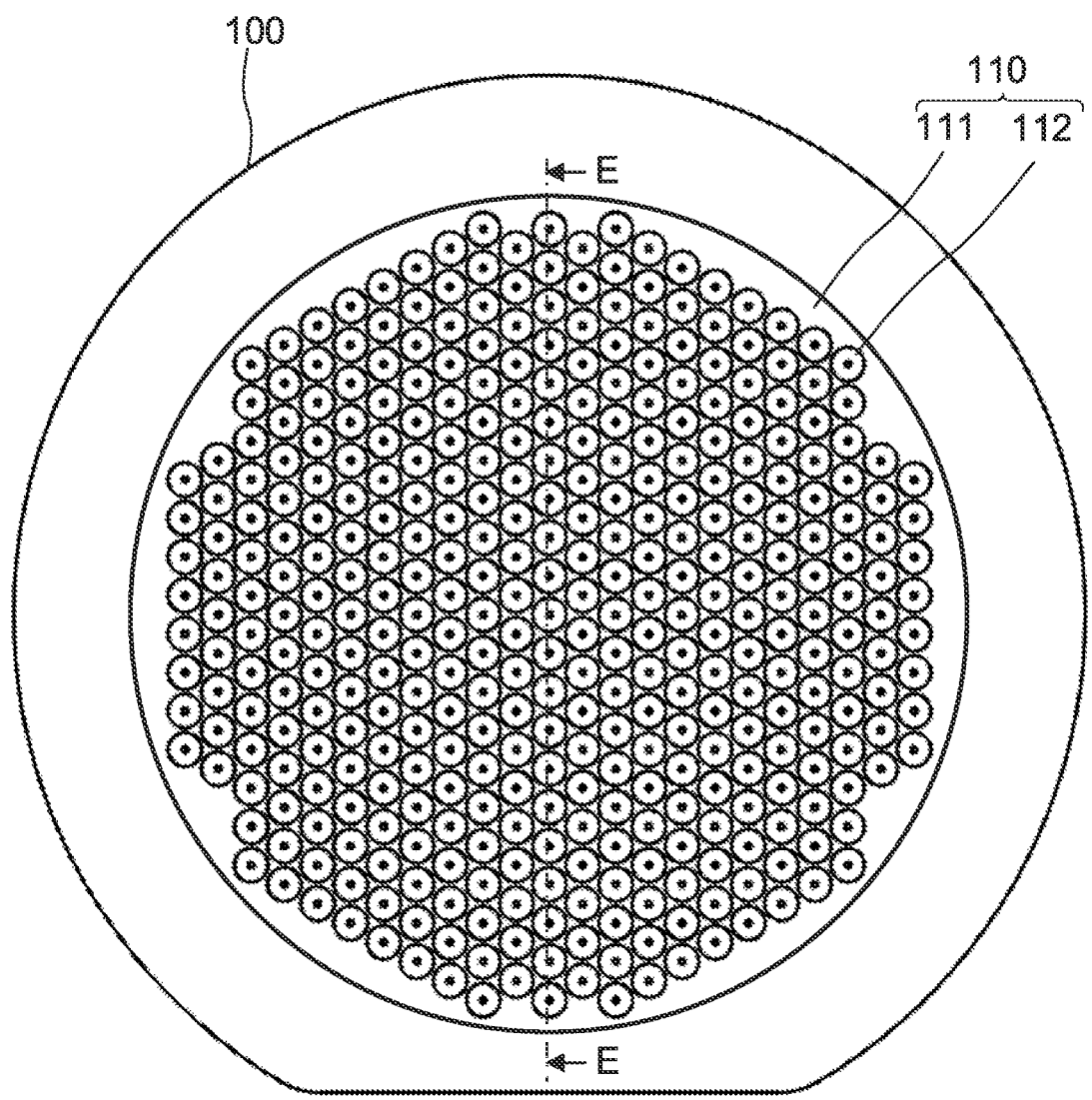
FIG. 8 is a bottom view of the electromagnetic flux controlling member according to the variation of Embodiment 1.
Figure 9:
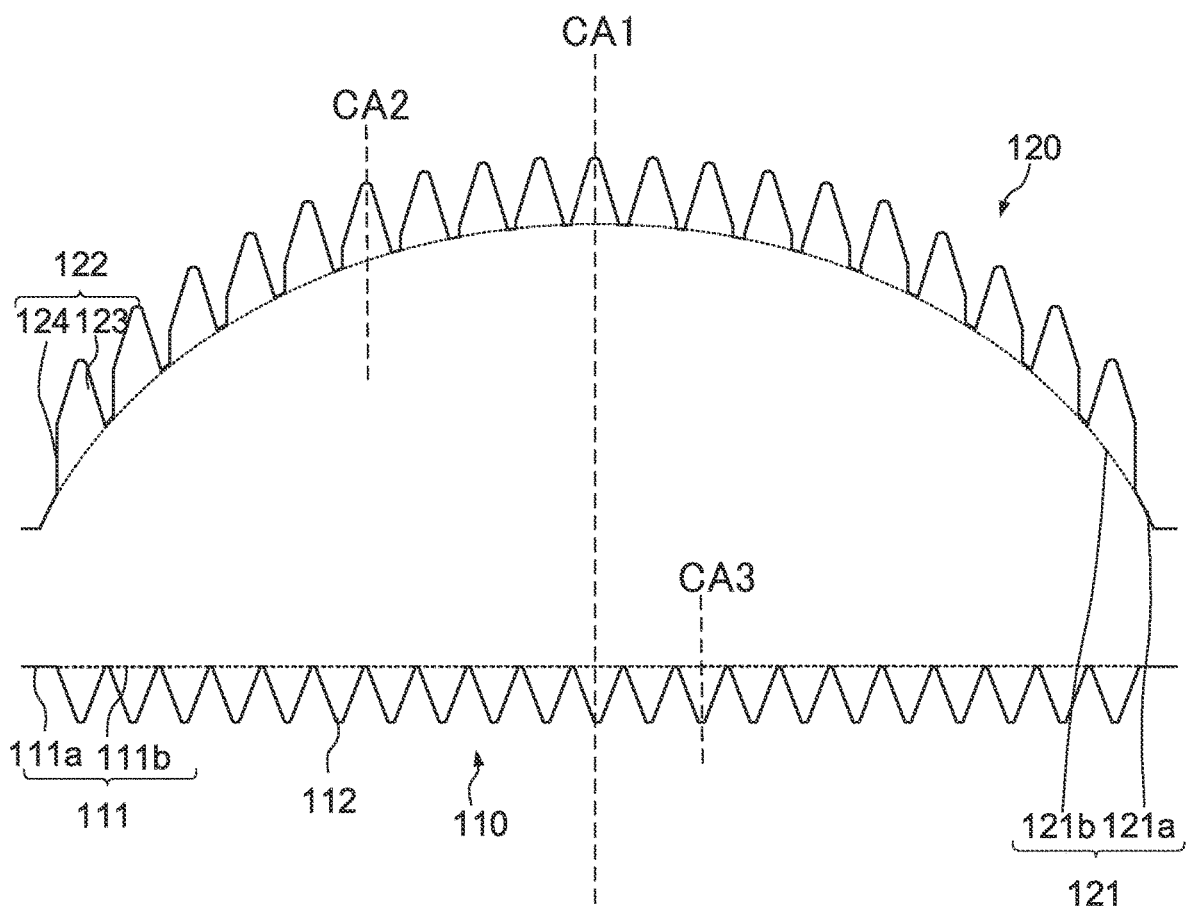
FIG. 9 is a schematic sectional view taken along line E-E in FIG. 8.

As illustrated in FIGS. 7 to 9, in the present embodiment, incidence surface 110 of electromagnetic flux controlling member 100 may have base flat surface 111 and a plurality of projections 112 arranged on base flat surface 111. FIG. 7 is a left side view of electromagnetic flux controlling member 100 according to a variation of Embodiment 1. FIG. 8 is a bottom view of electromagnetic flux controlling member 100 according to the variation. FIG. 9 is a schematic sectional view taken along line E-E in FIG. 8. In FIG. 9, for ease of understanding base flat surface 111 and the shapes of base flat surface 111 and projections 112, the scale is changed and hatching is omitted.

Base flat surface 111 is a generic term for one or more flat surfaces 111*a* and one or more imaginary flat surfaces 111*b* of incidence surface 110. Imaginary flat surface 111*b* is a flat surface supposed to be located above the protrusions and to exist continuously with surrounding flat surface 111*a*. One or more flat surfaces 111*a* and one or more imaginary flat surfaces 111*b* smoothly continuingly constitute one base flat surface 111.

Base flat surface 111 may include only flat surface 111*a*, may include only imaginary flat surface 111*b*, or may have both of the flat surfaces. As illustrated in FIG. 9, in the present embodiment, base flat surface 111 includes flat surface 111*a* and imaginary flat surface 111*b*. That is, in the present embodiment, incidence surface 110 has flat surface 111*a* and a plurality of projections 112 disposed on imaginary flat surface 111*b*.

The shape of base flat surface 111 is not particularly limited. In the present embodiment, the shape of base flat surface 111 is rotationally symmetrical with respect to main axis CA1 of electromagnetic flux controlling member 100 as a rotational axis. More specifically, in the present embodiment, the shape of base flat surface 111 is a substantially circular flat surface.

The plurality of projections 112 are projections arranged on base flat surface 111. In the present embodiment, a plurality of projections 112 are arranged on imaginary flat surface 111*b* of base flat surface 111 and are integrally formed with other components of electromagnetic flux controlling member 100. Here, the cross-sectional area gradually increases toward the base from the tip end of each of the plurality of projections 112. Thus, upon incidence of electromagnetic waves, a continuous and gentle change in average refractive index between the air and electromagnetic flux controlling member 100 can be achieved. Therefore, at incidence surface 110, it is possible to make it unlikely to cause reflection of the electromagnetic wave.

It is preferable that the shape of each of the plurality of projections 112 be such a shape that the cross-sectional area decreases toward the tip end from the base, from the viewpoint of the continuous and gentle change in the refractive index during the incidence of the electromagnetic wave on incidence surface 110. Examples of the shape of each of the plurality of projections 112 include a frustum, a cone, and the like. In the present embodiment, the shapes of each of the plurality of projections 112 are substantially conical.

The sizes and shapes of the plurality of projections 112 may be the same or different from one another. From the viewpoint of not hindering the control on the electromagnetic wave by the shape of base curved surface 121, it is preferable that the sizes and shapes of tip portions 123 are the same.

The distance from the bases to the tip ends of the plurality of projections 112 is not particularly limited, but is preferably 0.1 times or more and 0.25 times or less the wavelength of the electromagnetic wave. The distance within the above range allows continuous and gentle change in the refractive index. It is thus possible to make it unlikely to cause reflection of the electromagnetic waves. Further, it is possible to easily demold electromagnetic flux controlling member 100 during manufacturing it by molding with a metal mold.

The ratio of the partial area of the plurality of disposed projections 112 with respect to the area of base flat surface 111 is not particularly limited, but is preferably as large as possible from the viewpoint of making it unlikely to cause reflection of the electromagnetic waves, and the ratio closer to 100% is preferable.

Further, a plurality of projections 112 may be separated from one another, but may be in contact with one another. From the viewpoint of making it unlikely to cause reflection of electromagnetic waves, it is preferable that the projections are in contact with one another. Accordingly, the number (density) of the plurality of projections 112 can be increased.

Central axis CA3 of the plurality of projections 112 and main axis CA1 of electromagnetic flux controlling member 100 may be parallel or do not have to be parallel to each other. From the viewpoint of easily performing demolding during manufacturing electromagnetic flux controlling member 100 by molding it with a metal mold, it is preferable that central axis CA3 of the plurality of projections 112 and main axis CA1 of electromagnetic flux controlling member 100 be parallel to each other. Here, in the present embodiment, the "central axis of the plurality of projections 112" means a straight line passing through the tip ends of the plurality of projections 112 and perpendicular to base flat surface 111. In case that the plurality of projections 112 are a frustum, the central axis means a straight line that passes through the center of the bottom surface located at the tip end of each of the plurality of projections 112 and that is perpendicular to base flat surface 111.

As is understood, in case that incidence surface 110 includes base flat surface 111 and a plurality of projections 112 arranged on base flat surface 111, it is possible to also make it unlikely to cause reflection, at incidence surface 110, of electromagnetic waves incident on electromagnetic flux controlling member 100.

In the above description, electromagnetic flux controlling member 100 has been described in which incidence surface 110 is a flat surface, and emission surface 120 is a curved surface. However, electromagnetic flux controlling member 100 according to the present embodiment is not limited thereto. For example, incidence surface 110 may be a curved surface and emission surface 120 may be a flat surface. In this case, a plurality of protrusions including a conical tip portion and a partially columnar leg portion are arranged on incidence surface 110. Also, both incidence surface 110 and emission surface 120 may be a curved surface. In this case, a plurality of protrusions including a conical tip portion and a partially columnar leg portion are arranged on at least one of incidence surface 110 and emission surface 120. In addition, incidence surface 110 or emission surface 120 may be a concave curved surface.

Further, from the viewpoint of making it unlikely to cause reflection of electromagnetic waves on incidence surface 110 and emission surface 120, it is preferable that each of incidence surface 110 and emission surface 120 have a plurality of protrusions.

In the above description, electromagnetic flux controlling member 100 has been described in which a plurality of protrusions 122 are formed integrally with the other components. However, electromagnetic flux controlling member 100 according to the present embodiment is not limited thereto. For example, a plurality of protrusions 122 manufactured separately may be arranged on curved surface 121a of base curved surface 121.

Effects

As described above, according to electromagnetic flux controlling member 100 according to the present embodiment, it is possible to dispose a plurality of protrusions 122 on base curved surface 121 of emission surface 120 at a high density such that the protrusions have a substantially constant height. It is thus possible to further suppress reflection of electromagnetic waves. Accordingly, the use of electromagnetic flux controlling member 100 as a lens antenna, for example, in radio communication using radio waves makes it possible to obtain a high antenna gain.

Embodiment 2

Figure 10:
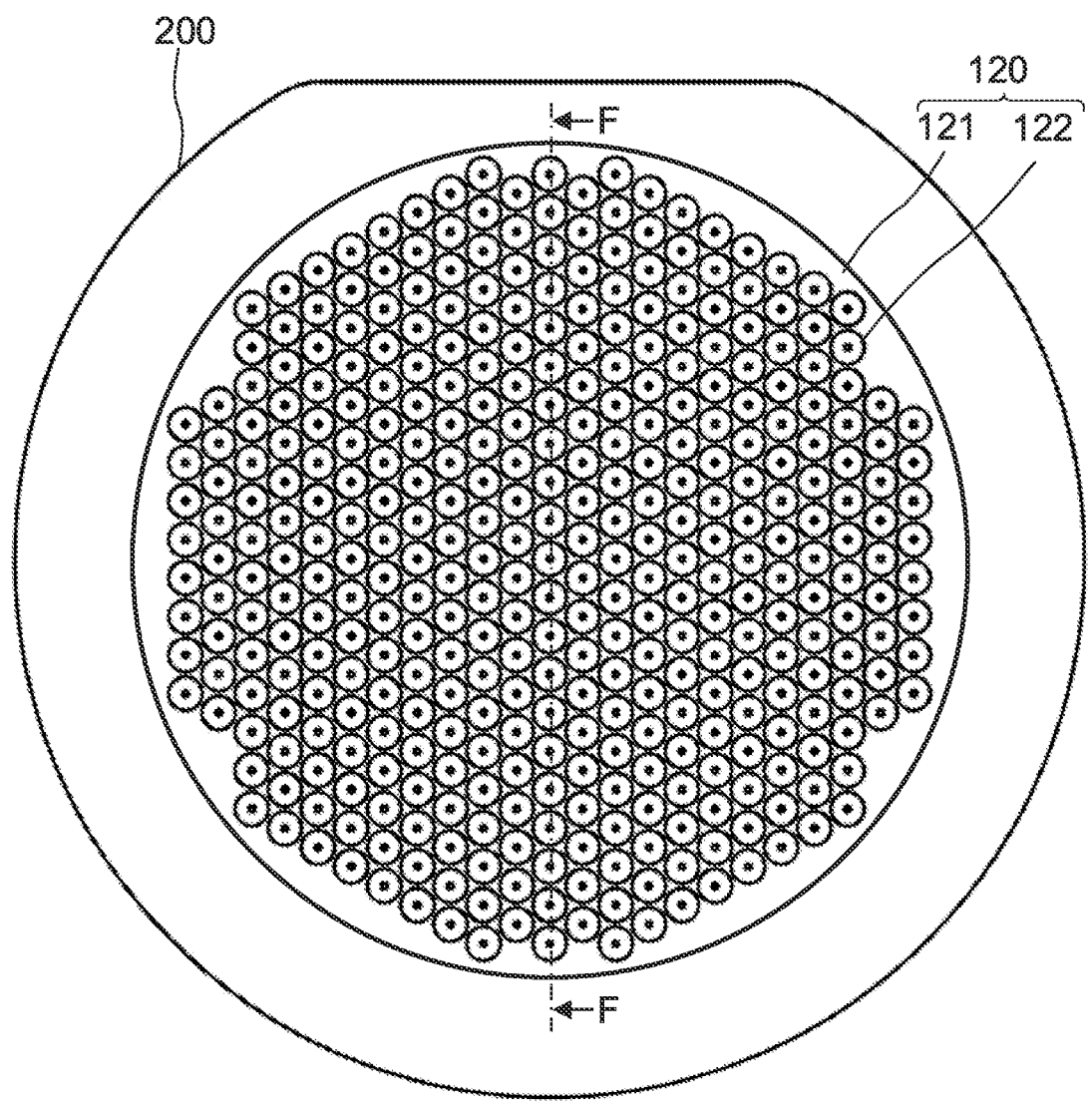
FIG. 10 is a plan view of an electromagnetic flux controlling member according to Embodiment 2.
Figure 11:
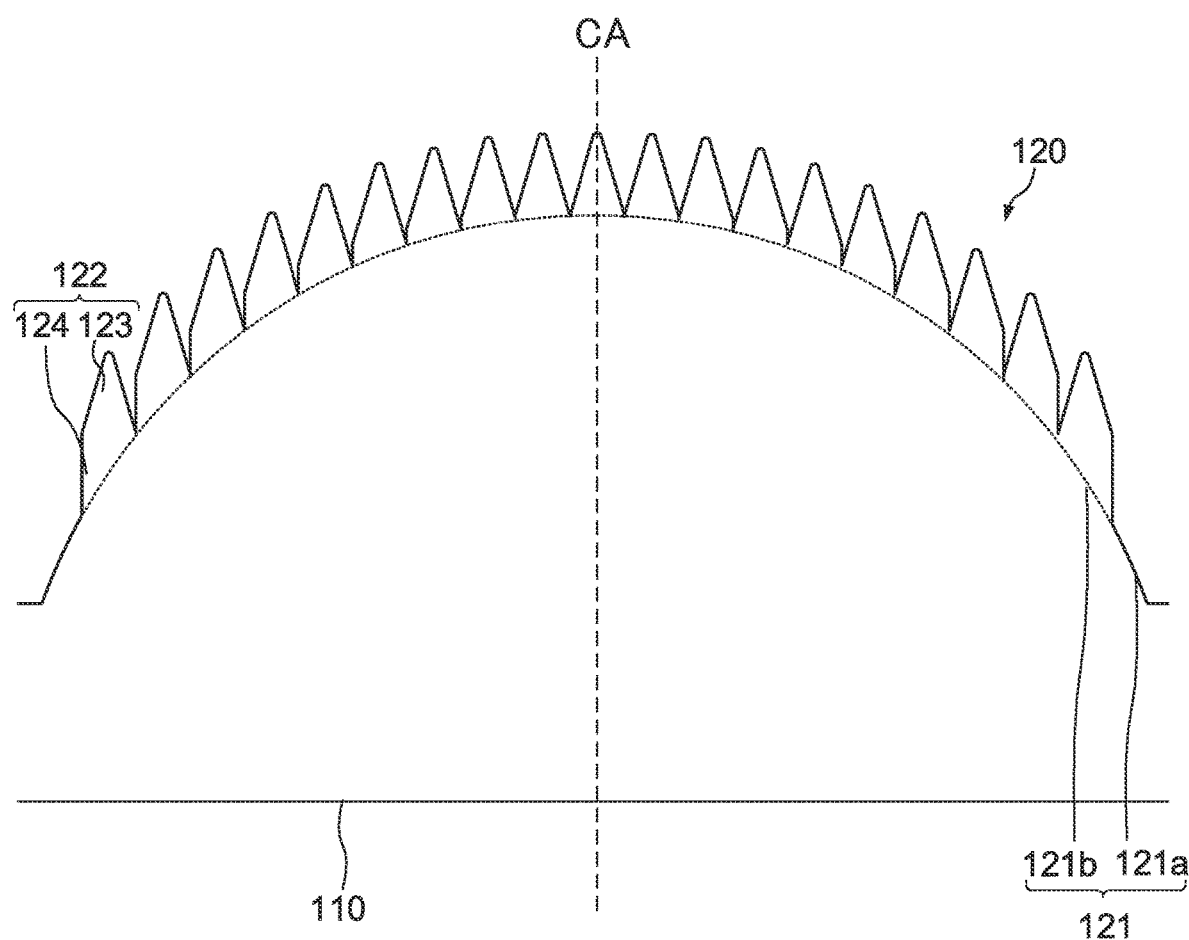
FIG. 11 is a schematic sectional view taken along line F-F in FIG. 10.

FIG. 10 is a plan view of electromagnetic flux controlling member 200 according to Embodiment 2. FIG. 11 is a schematic sectional view taken along line F-F in FIG. 10. In FIG. 11, for ease of understanding of the shape of base curved surface 121 and protrusions 122, the scale is changed and hatching is omitted.

Electromagnetic flux controlling member 200 according to Embodiment 2 is different from electromagnetic flux controlling member 100 according to Embodiment 1 in that a plurality of protrusions 122 are in contact with one another. Thus, it is possible to arrange a plurality of protrusions 122 more densely, and, it is possible to further increase the number of a plurality of protrusions 122. It is thus possible to increase the ratio of the partial area of the plurality of disposed protrusions 122 with respect to the area of base curved surface 121. Therefore, it is possible to make it more unlikely to cause reflection of the electromagnetic wave to be emitted.

Here, in the present embodiment, in case that electromagnetic flux controlling member 200 is seen in plan view, the ratio of the partial area of the plurality of disposed protrusions 122 with respect to the area of base curved surface 121 is not particularly limited, but is preferably as large as possible from the viewpoint of making it unlikely to cause reflection of the electromagnetic waves, and the ratio closer to 100% is preferable.

The shape of the plurality of protrusions 122 is not particularly limited. In the present embodiment, tip portion 123 is conical and leg portion 124 is partially cylindrical. From the viewpoint of disposing a plurality of protrusions 122 at a higher density, it is preferable that each of leg portions 124 have the shape of a partial regular hexagonal prism. Here, the "shape of a partial regular hexagonal prism" means a remaining portion of the regular hexagonal prism after having been partly cut. In this case, the shape of tip portion 123 is not particularly limited, and may be conical, or may be a regular hexagonal pyramid. It is preferable that the shape of tip portion 123 may be conical from the viewpoint of reducing the anisotropy (polarization dependence) to electromagnetic waves.

With the above shape that each of a plurality of protrusions 122 has, the gaps generated between protrusions 122 can be reduced and the ratio of the partial area of the plurality of disposed protrusions 122 can be increased with respect to the area of base curved surface 121, when the plurality of protrusions 122 are arranged so as to be in contact with each other. Thus, in plan view, the ratio of the area occupied by the plurality of protrusions 122 with respect to the area of emission surface 120 is increased, and it is possible to make it unlikely to cause reflection of the electromagnetic wave emitted.

From the viewpoint of further reducing the gaps generated between the protrusions, it is preferable that the sizes of the partial regular hexagonal prisms and the regular hexagonal pyramids be the same.

In the above description, electromagnetic flux controlling member 200 has been described in which incidence surface 110 is a flat surface and emission surface 120 has base curved surface 121. However, electromagnetic flux controlling member 200 according to the present embodiment is not limited thereto. For example, incidence surface 110 may have the base curved surface and emission surface 120 may be a flat surface. In this case, a plurality of protrusions including a conical tip portion and a partially columnar leg portion are arranged in contact with one another on incidence surface 110. Also, both incidence surface 110 and emission surface 120 may have a base curved surface. In this case, a plurality of protrusions including a conical tip portion and a partially columnar leg portion are arranged in contact with one another on at least one of incidence surface 110 and emission surface 120. In addition, incidence surface 110 or emission surface 120 may have a concave base curved surface.

Further, from the viewpoint of making it unlikely to cause reflection of electromagnetic waves on incidence surface 110 and emission surface 120, it is preferable that each of incidence surface 110 and emission surface 120 have a plurality of protrusions.

Effects

As described above, according to electromagnetic flux controlling member 200 according to the present embodiment, it is possible to further suppress the reflection of emitted electromagnetic waves by arranging a plurality of protrusions 122 in contact with one another on base curved surface 121.

INDUSTRIAL APPLICABILITY

The electromagnetic flux controlling member of the present invention is capable of suppressing the reflection of electromagnetic waves, and is thus useful, for example, in the radio communication and in the optical field.

REFERENCE SIGNS LIST 100, 200 Electromagnetic flux controlling member
110 Incidence surface
111 Base flat surface
112 Protrusion
120 Emission surface
121 Base curved surface
122 Protrusion
123 Tip portion
124 Leg portion

The invention claimed is:

1. An electromagnetic flux controlling member, comprising:
    an incidence surface for allowing incidence of an electromagnetic wave; and
    an emission surface for emitting the electromagnetic wave incident on the incidence surface to an outside, wherein
    at least one of the incidence surface and the emission surface includes a base curved surface and a plurality of protrusions arranged on the base curved surface,
    each of the plurality of protrusions includes:
        a conical tip portion disposed such that at least a part of an edge of a bottom surface of the conical tip portion makes contact with the base curved surface, and
        a partially columnar leg portion disposed between the conical tip portion and the base curved surface,
    a central axis of the conical tip portion and a central axis of the partially columnar leg portion are parallel to a main axis of the electromagnetic flux controlling member, and
    a size and a shape of the bottom surface of the conical tip portion as seen in plan view are the same as a size and a shape of a bottom surface of the leg portion, respectively.

2. The electromagnetic flux controlling member according to claim 1, wherein
    a shape and a size of the conical tip portions of the plurality of protrusions are the same between the conical tip portions.

3. The electromagnetic flux controlling member according to claim 1, wherein
    the plurality of protrusions are in contact with one another.

4. The electromagnetic flux controlling member according to claim 1, wherein the electromagnetic wave includes a radio wave.

5. An electromagnetic flux controlling member, comprising:
    an incidence surface for allowing incidence of an electromagnetic wave; and
    an emission surface for emitting the electromagnetic wave incident on the incidence surface to an outside, wherein
    at least one of the incidence surface and the emission surface includes a base curved surface and a plurality of protrusions arranged on the base curved surface,
    each of the plurality of protrusions includes:
        a conical tip portion disposed such that at least a part of an edge of a bottom surface of the conical tip portion makes contact with the base curved surface,
        a partially columnar leg portion disposed between the conical tip portion and the base curved surface,
        a central axis of the conical tip portion and a central axis of the partially columnar leg portion are parallel to a main axis of the electromagnetic flux controlling member, and
    the plurality of protrusions as seen in plan view are disposed on a plurality of concentric circles around a point where the main axis passes, and
    the plurality of protrusions are disposed at an equal interval on a circumference of each of the plurality of concentric circles.

6. The electromagnetic flux controlling member according to claim 5, wherein
    a shape and a size of the conical tip portions of the plurality of protrusions are the same between the conical tip portions.

7. The electromagnetic flux controlling member according to claim 5, wherein
    the plurality of protrusions are in contact with one another.

8. The electromagnetic flux controlling member according to claim 5, wherein the electromagnetic wave includes a radio wave.

* * * * *